United States Patent [19]

Patty et al.

[11] Patent Number: 4,559,861

[45] Date of Patent: Dec. 24, 1985

[54] MUSICAL TEACHING DEVICE FOR EXPEDITING MUSICAL INSTRUCTION

[75] Inventors: Charles W. Patty; Myron Weiss, both of New York, N.Y.

[73] Assignee: Myron Weiss, New York, N.Y.

[21] Appl. No.: 479,851

[22] Filed: Mar. 28, 1983

[51] Int. Cl.[4] .................................................. G09B 15/02
[52] U.S. Cl. ............................... 84/470 R; 84/477 R; 84/485 R
[58] Field of Search ................ 84/470 R, 471 R, 476, 84/477 R, 485 R

[56] References Cited

U.S. PATENT DOCUMENTS

| | | | |
|---|---|---|---|
| 357,168 | 2/1887 | Barnwell | 84/485 X |
| 830,915 | 9/1906 | Myers | 84/485 R |
| 1,300,193 | 4/1919 | Raff | 84/485 R |
| 1,412,587 | 4/1922 | Willoughby | 84/471 |
| 1,821,516 | 9/1931 | Hohn | 84/485 R |
| 3,245,303 | 4/1966 | Patt | 84/485 |
| 3,403,590 | 10/1968 | Quinton | 84/470 |
| 3,758,693 | 9/1973 | Matyas | 84/485 |
| 3,978,757 | 9/1976 | Johnson, Jr. et al. | 84/485 R |
| 4,257,306 | 3/1981 | Laflamme | 84/485 R |
| 4,295,406 | 10/1981 | Smith | 84/470 R |
| 4,417,497 | 11/1983 | Nicklaus | 84/485 R |

FOREIGN PATENT DOCUMENTS

| | | | |
|---|---|---|---|
| 21402 | of 1892 | United Kingdom | 84/485 R |
| 2028564 | 3/1980 | United Kingdom | 84/471 R |
| 2046980 | 11/1980 | United Kingdom | 84/471 R |

Primary Examiner—L. T. Hix
Assistant Examiner—Douglas S. Lee
Attorney, Agent, or Firm—Peter L. Michaelson

[57] ABSTRACT

A musical teaching device, which substantially shortens the amount of time which a student requires in order to understand various aspects of playing a stringed instrument, is described. This device is comprised of a grid of intersecting lines which represent strings and frets of a fingerboard of a stringed instrument, an indicator situated in the vicinity of each intersection and representing a corresponding musical note, and a plurality of moveable markers, each of which can be positioned anywhere on the grid and is identified by both a particular color and one or more symbols in order to visually depict a particular aspect of the instrument. These aspects illustratively include fingering of notes, chords and scales; harmony; melody; contrary motion, and rhythm.

19 Claims, 7 Drawing Figures

MUSICAL TEACHING DEVICE FOR EXPEDITING MUSICAL INSTRUCTION

BACKGROUND OF THE INVENTION

1. Field of Invention

This invention relates to a musical teaching device which substantially shortens the amount of time which a student requires in order to understand various aspects of playing a stringed instrument.

2. Description of Prior Art

Many people, at some point in their life, exhibit a desire to learn to play a musical instrument. A substantial number of these people will then obtain a suitable instrument and seek out requisite musical instruction.

Of all the instruments currently available, one of the most popular is the guitar. An individual plays the guitar by setting various strings vibrating with one hand while positioning the other hand on the fingerboard to change pitches (notes) to produce desired sounds. The guitar is held with the strings facing outwardly from the player. Consequently, while an individual plays a guitar he cannot easily see the strings and frets which lie along the neck of the instrument. This difficulty to visually perceive which strings are being depressed against a fret, and the particular frets against which the strings are being depressed forces the player to rely more on his senses of hearing and touch than on his sense of vision. This consequent lack of visual feedback significantly lengthens the time needed to understand the playing of the guitar. And this, in turn, makes the guitar one of the more difficult instruments to learn.

Various solutions aimed at providing visual feedback and thereby shortening the time required to learn the guitar have been proposed in the art. However, each possesses one or more serious drawbacks which limit its effectiveness for expediting a student's development of the various skills needed to play the guitar.

Specifically, U.S. Pat. No. 830,915 (issued Sept. 11, 1906 to J. W. Myers) describes a teaching device in particular, a chart, comprised of a sequence of single musical notes placed along a staff and a separate sketch or photograph of the actual fingering needed to play each note. Each photograph is appropriately placed on the chart so as to correspond to the proper note. As a result, the information conveyed to the student is limited to single-note fingering. Thus, this device does not substantially aid the student in learning other fundamental, though slightly more complicated, aspects of playing the instrument, e.g., chords, scales, and the like.

U.S. Pat. Nos. 1,300,193 (issued Apr. 8, 1919 to C. D. Raff) and 4,295,406 (issued Oct. 20, 1981 to L. C. Smith) also disclose devices which basically show single-note fingering and thus possess the same drawbacks as the device disclosed in the '915 patent. Specifically, in the '193 patent, one or more moveable slides are enclosed in a case. Each slide has imprinted on it the letters of the notes comprising a musical scale. Cut-outs are placed on a surface of the case thereby permitting the student to move each slide and see through the cut-outs the proper fingering position for each note of the selected scale. In the '406 patent, an electronic device is shown which has a plurality of switches, each marked with a musical note, and arranged on a treble staff, such that the position of each switch, as viewed by the student, corresponds to the proper position of the associated note on the staff. Whenever the student depresses a switch, the proper fingering is dislayed through the illumination of various indicators appropriately positioned as a fingerboard-like representation.

Teaching devices, known to the art, which can teach chord fingering are typified by the apparatus disclosed in U.S. Pat. Nos. 3,403,590 (issued Oct. 1, 1968 to B. Quinton); 3,758,698 (issued Sept. 11, 1973 to J. F. Matyas), and 4,257,306 (issued Mar. 24, 1981 to D. Laflamme). Specifically, the '590 patent shows a fingerboard having simulated strings with the space between various frets and strings marked with a letter identifying the note produced if a string was depressed against the fret at that position and picked. The notes comprising each major chord are given on a chart located at the rear of the fingerboard. The student can then refer to the chart to determine the notes comprising a chord and can then position his fingers accordingly. Unfortunately, this device does not display the fingering for the student to view but rather relies on the student's ability given the proper notes of a chord to correctly position his fingers on the fingerboard. Consequently, if the student's fingering is wrong, this device disadvantageously will not provide the correct fingering. Moreover, this device is limited to showing the fingering of only one chord at a time. Thus, this device and others—described hereinbelow—like it are all incapable of showing transitions in fingering, i.e., the movement of each finger when shifting from one chord to another. Since chord changes form the core of much of the guitarists' responsibility, information regarding proper finger transitions is extremely important to the student. Unfortunately, the student is often left to acquire proper finger transitions solely from years of playing experience. Consequently, this disadvantageously lengthens the period of time which the student requires to learn the instrument.

The device shown in the '698 patent is comprised of a series of slides in which each can be moved in a case that has a top surface resembling a fingerboard and more specifically has a cut-out in each possible finger position. Each slide corresponds to a string and can be positioned to show the single-note fingering occurring all along the string. By moving all the slides, the fingering for any given chord can be shown. However, this device, like that described in the '590 patent, is capable of displaying the fingering of only one chord at a time. Lastly, the electronic device described in the '306 patent possesses similar limitations.

Another approach taken in the art is typified by that shown in U.S. Pat. No. 3,978,757 (issued Sept. 7, 1976 to W. T. Johnson, Jr., et al). Here, a device is described in which the proper fingering for any chord or note is indicated by illuminated lamps, appearing on a fingerboard display and/or on a chord diagram, in positions corresponding to the proper fingering. Yet, this device is only capable of displaying fingering associated with one chord at a time. Moreover, this device is relatively expensive to build and cumbersome to use.

A further approach is typified by the apparatus described in U.S. Pat. No. 1,821,516 (issued Sept. 1, 1931 to M. B. Hohn). There, each one of four rigid rods is used to represent a corresponding string of a violin. Four consecutively numbered markers can be slid along each rod. A chart which shows the fingering for a desired musical scale can be placed behind the rods such that the fingering is visible to the student. The markers can then be slid into positions to correspond to the fingering needed to play any note in that scale. Unfortunately, this device is also unable to show chords. In addition, the inability to change the ordering of the markers on each rod limits the usefulness of the device as an educational tool. Moreover, the need to insert a chart renders the device cumbersome to use.

Lastly, U.S. Pat. No. 3,245,303 (issued Apr. 12, 1966 to R. O. Patt) describes a further type of musical teaching device known to the art. In this device, a transaprent sheet, i.e., an overlay, has a plurality of grid-like fingerboard representations drawn on it. This overlay is placed over a sheet which has a plurality of encircled numbers drawn on it. Each number corresponds to one of the four playing fingers of the left hand and all the numbers represent the fingering position for all the chords comprising a major chord type. When the overlay is appropriately positioned over the sheet, the fingering for any given chord in any desired voicing, or key, can be displayed. The key can be changed by vertically moving either the sheet or the overlay with respect to the other. However, the usefulness of this device is limited because only those chords of any one major type, e.g., a major sixth, are visibly depicted on any one sheet and are thus visible to the student only one at a time. Consequently, this device does not readily permit the fingering for two or more chords of two or more different types to be displayed simultaneously, and therefore, disadvantageously limits the amount of information that can be presented to the student. This, in turn, disadvantageously does not appreciably shorten the time required by the student to learn the instrument.

Thus, as can be readily appreciated from the foregoing, each device known in the art and, particularly those discussed hereinabove, is aimed at displaying only one fundamental aspect of the instrument, e.g., fingering of a note or chord. However, playing the guitar—or any stringed instrument—requires the mastery of many fundamental aspects, such as but not limited to: fingering notes, scales and chords; efficient fingering transitions between different notes, scales and chords; harmonic inter-relationships between the notes comprising any given scale or chord (including mode changes); counterpoint (including contrary motion), rhythm and accents. Moreover, each such aspect is not unique into itself but is highly related to the others. As such, knowledge of all these relationships is necessary for mastery of the instrument. Since each prior art teaching device is only aimed at essentially one fundamental aspect, the amount of information which it is capable of conveying to the student, in relation to that which the student needs to know to master the instrument, is rather small. Thus, none of these devices appreciably shortens the amount of time which the student requires to learn and master the instrument.

In addition, many of the devices known to the art—of which some of those discussed hereinabove are illustrative—are complex to use and thus counter-productive to the student. Specifically, the student, in order to use any such device, is burdened with having to spend substantial amounts of time learning to use the teaching device itself. During this time, the student is temporarily distracted from learning to play the instrument, and thus feels as though he is making little, if any, progress towards achieving that goal. As a result, the student becomes frustrated. If the device is too difficult to learn and use, the student's frustration may well increase to a point where he will abandon his goal of learning to play the instrument.

SUMMARY OF THE INVENTION

Accordingly, it is an object of this invention to provide a musical teaching device which maximizes the amount of information that can be conveyed to the student in order to substantially reduce the amount of time which a student requires to learn a stringed instrument.

Another object of this invention is to provide such a device which is extremely simple so that the student only needs to spend a minimal amount of time in understanding how to use the device and is thus less likely to become frustrated at learning the instrument.

A particular object of this invention is to convey information regarding all fundamental aspects of playing a stringed instrument such that the student can visually perceive and appreciate all the inter-relationships existing therebetween.

A more particular object of this invention is to easily and effectively convey information regarding not only fingering but also harmony, melody, and rhythm.

Another more particular object of this invention is to easily and effectively convey information regarding chord-to-chord and scale-to-scale fingering transitions.

A further more particular object of this invention is to easily permit the student to make simultaneous comparisons between the fingering of a plurality of chords of different types, and/or between different scales.

A further object of this invention is to provide such a device which is very inexpensive and exceptionally easy to manufacture.

These and other objects are achieved in accordance with the invention by a musical teaching device which is comprised of a grid having a plurality of intersecting lines which represent strings and frets associated with a fingerboard of a stringed instrument, an indicator situated in the vicinity of each intersection and representing a corresponding musical note, and a plurality of moveable markers each of which can be positioned anywhere on the grid and is identified by both a particular color and one or more symbols in order to visually depict a particular aspect of playing an instrument. These aspects illustratively include fingering of notes, cords, and scales; harmony, melody, and rhythm.

In accordance with the specific embodiment disclosed herein, the grid is printed on a metallic base. Each marker is a magnetic disc and can be positioned anywhere on the grid. One side of the disc is colored and has a numeral printed on its suface. One group of numerals, specifically arabic numbers 1 through 4, are used to indicate fingering, while another group, specifically Roman numerals I through VII, are used to indicate harmonic relationships. Accents and contrary motion are indicated by the color of the numbered surface of the disc.

By properly positioning the appropriate markers on the grid—as discussed in greater detail hereinbelow—the student is immediately and simultaneously able to visually perceive a variety of musical information (such as note names, chord types, scales, harmony, accents, and inter-relationships therebetween), and thereby to fully understand it, all in a much shorter period of time than heretofore possible. This, in turn, advantageously substantially shortens the amount of time needed by the student to learn the instrument.

BRIEF DESCRIPTION OF THE DRAWING

The invention may be clearly understood from a consideration of the following detailed description and accompanying drawing in which.

To readily facilitate easy understanding, identical reference numerals are used to denote identical elements common to two or more figures.

DETAILED DESCRIPTION

Figure 1:
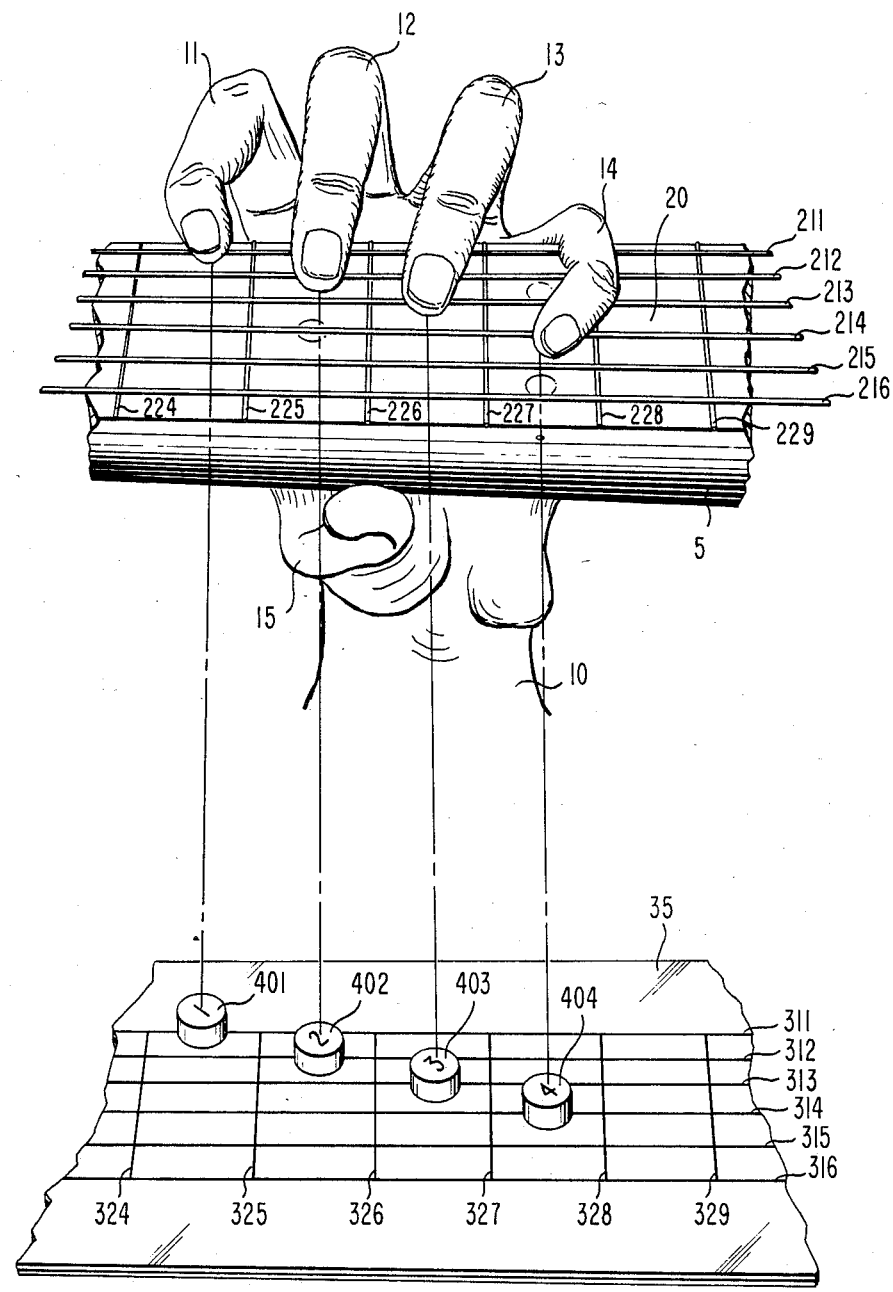
FIG. 1 shows the fingers of a student's left hand positioned on a portion of a guitar or fingerboard and a portion of applicants' teaching device, and depicts the correspondence between the positions of the student's fingers and the positions of applicants' fingering markers.

FIG. 1 shows a portion of a guitar fingerboard 20 and a simplified rendering of a portion of applicants' musical teaching device. Specifically, to play the guitar, a student or player places his thumb 15 of his fingering hand 10 against the bottom surface of the neck, and each of the other fingers 11, 12, 13 and 14 of the fingering hand depresses one or more of the six strings of the guitar, labelled 211, 212, 213, 214, 215, and 216, against one of the frets, labelled 224, 225, 226, 227, 228, and 229 on fingerboard 20.

As shown, applicants' musical teaching device is comprised of grid 30 (hereinafter referred to as fingerboard grid 30) containing a plurality of intersecting lines which represent strings and frets of fingerboard 20. Lines (hereinafter referred to as string lines) 311, 312, 313, 314, 315, and 316 represent strings 211, 212, 213, 214, 215, and 216. For purposes of clarity, only a portion of grid 30 is shown, with that portion also containing lines (hereinafter referred to as fret lines) 324, 325, 326, 327, 328, and 329 which represent frets 224, 225, 226, 227, 228, and 229 on fingerboard 5. Grid 30 is shown in greater detail in FIG. 3 which is discussed hereinbelow. In addition, moveable markers are positioned anywhere on the grid to indicate many different aspects of playing the guitar. These aspects include fingering of notes, scales and chords; harmonic relationships between notes, contrary motion and accented notes. The particular aspect conveyed by any marker is determined by the color of the marker and the symbol appearing thereon. Arabic numerals are used to indicate fingering information, and Roman numerals, as discussed hereinbelow, indicate harmonic relationships.

As shown in FIG. 1, moveable markers 401, 402, 403, 404 are used to indicate fingering. Specifically, each of these markers is appropriately positioned in fingerboard grid 30 to depict the position of a corresponding finger of the fingering hand. For example, marker 401 which carries the numeral "1" corresponds to the first finger, 11, of the fingering hand. This marker is shown positioned on string line 311 between fret lines 324 and 325 which, in turn, corresponds to the student positioning finger 11 on string 211 and depressing it between frets 224 and 225. In a similar manner, moveable markers 402, 403, and 404 are positioned on fingerboard 30 to depict the position of fingers 12, 13, and 14 respectively on fingerboard 20.

Figure 2:
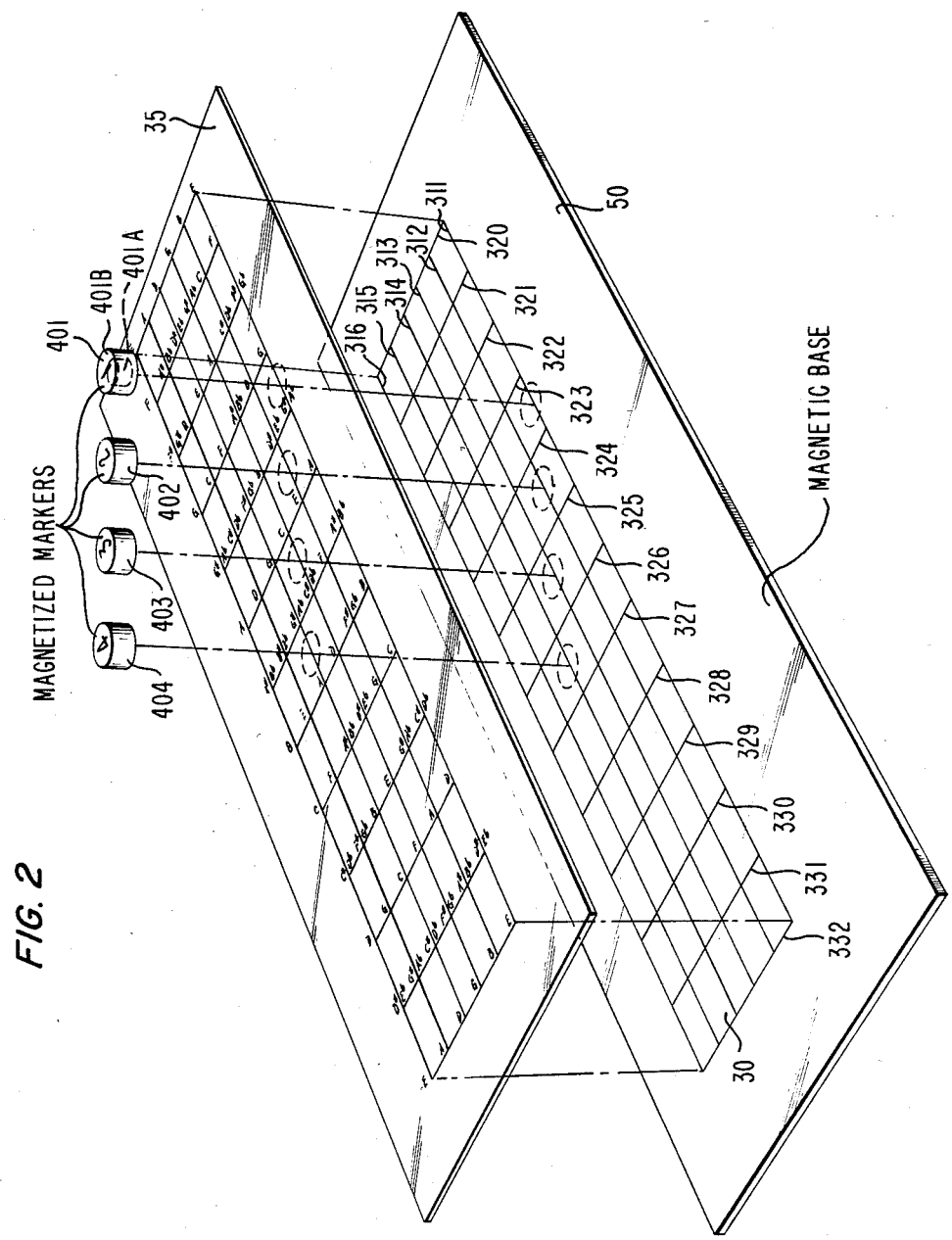
FIG. 2 shows the structure of applicants' musical teaching device.

A preferred manner of constructing applicants' teaching device is shown in FIG. 2. Specifically, grid 30 is printed on magnetic base member 50. This magnetic base is preferably comprised of a sheet of magnetic metallic material, such as any one of a number of various steel alloys. Overlaying the magnetic base is a transparent sheet 35 on which is printed indicators, illustratively letters, which correspond to the names of the notes. A number of moveable markers, which include previously discussed markers 401 through 404, are positioned on the top of sheet 35. Each moveable marker, such as 404, is magnetized, and more particularly contains a magnet, illustratively shown as, covered by a colored cap, illustratively shown as, which has either an arabic or a Roman numeral inscribed on its top surface. Consequently, as each marker is appropriately positioned on fingerboard grid 30, the magnetic attraction between it and magnetic base 50 prevents the marker from being inadvertently knocked out of position.

Figure 3:
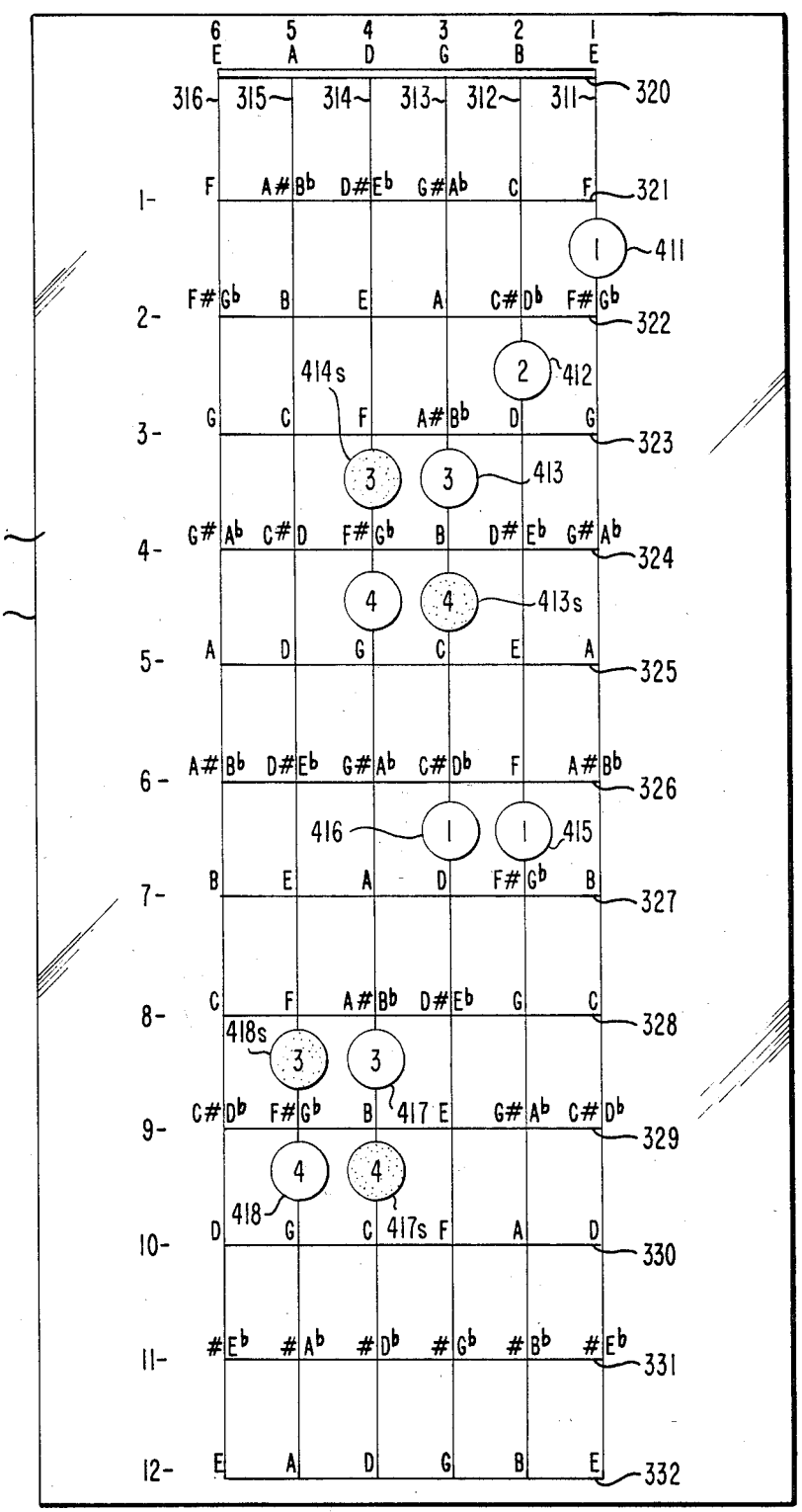
FIG. 3 shows in detail one full octave of the fingerboard grid of applicants' teaching device and the fingering markers arranged to depict the fingering both for the same chord type in two separate positions and for contrary motion involving this chord type.

Fingerboard grid 30 is shown in detail in FIG. 3. As shown, the fingerboard grid contains as many fret lines as are needed to correspond to one full octave of notes. In the case of the guitar, 12 frets including the nut are necessary. These fret lines are labelled 320 through 332. On the guitar, each fret is commonly referred to either by a numeral indicating its position relative to other frets, e.g., first fret, second fret, and so on. To simplify instruction, these reference numerals, 1 through 12, are indicated on fingerboard grid 30. The spacing between any two adjacent frets is known as a "half-step" and between any two frets separated by a third fret is known as a "full-step". The fingerboard grid—as previously discussed—also contains a corresponding string line for each string of the guitar. String lines 311 through 316 represent the six strings on a guitar. Each string is commonly referred to by its musical designation, e.g. standard tuning the first E, B, G, D, A or bass (sixth) E string; or by a numeral indicating its position relative to other strings, e.g., first string, second string, and so on. Again to simplify instructions, these reference numerals, 1 through 6, are included above fingerboard grid 30.

An indicator, illustratively a letter and, where necessary, a musical sharp or flat designation, is placed in the vicinity, i.e., immediately to the left, of each intersection between a string line and a fret line. This letter identifies the particular note that would be produced if the corresponding string were depressed behind the corresponding fret and picked at any position below the fret. For example, if the bass (sixth) E string were depressed against the first fret and then picked, an F note would be produced. Hence, an F exists in the vicinity of the intersection between fret line 321 and string 316. In some instances, various musical notes are referred to by either of two different note designations. For example, an "A sharp" is also referred to as a "B flat." Likewise a "D sharp" is also referred to as an "E flat." Therefore, to further simplify instruction, alternative note names, where applicable, are also placed in the vicinity of each intersection and, more particularly, to the immediate right of each such intersection.

Also shown in FIG. 3 is the arrangement of a number of moveable markers, specifically, moveable markers 411, 412, 413, and 414, to show the correct fingering for a G major 7th chord comprised of the G, B, D, and F sharp notes. The fingering for the same chord but in a higher position is shown by the position of moveable markers 415, 416, 417, and 418.

By simultaneously displaying the fingering of both chords, applicants' invention allows the student to immediately perceive the most efficient transitions in fingering necessary to change keys for the same chord type. Not only can be readily perceive which fingers must shift positions, i.e., move from one string to another, but also and, more importantly, the student can visually perceive the shortest possible distance that each finger must move across the strings in order to move from one fingering pattern to another. While this facet of applicants' invention has, for purposes of illustration, been described in terms of the same basic chord type, clearly many different chords, notes, and—as will become evident shortly—scales can be displayed simultaneously by appropriately positioning appropriate ones of moveable markers 400 in order to allow the student to immediately perceive the fingering transitions existing therebetween.

Lastly, FIG. 3 also shows the depiction of contrary, motion, specifically tri-tone resolution, using applicants' invention. In general, a chord involves the simultaneous construction of notes that have relative pitches. Contrary motion refers to notes moving in opposite directions. As previously discussed, the fingering patterns for two G major 7th chords are shown in this figure. The change in fingering needed to produce the contrary motion is indicated by the stipled markers. The stipling signifies that the moveable markers, that represent notes affected by contrary motion, have a differently colored cap than those markers which represent the other notes. Thus, applicants' invention advantageously permits the student to visually perceive and immediately grasp the inter-relationship between contrary motion and fingering.

Figure 4:
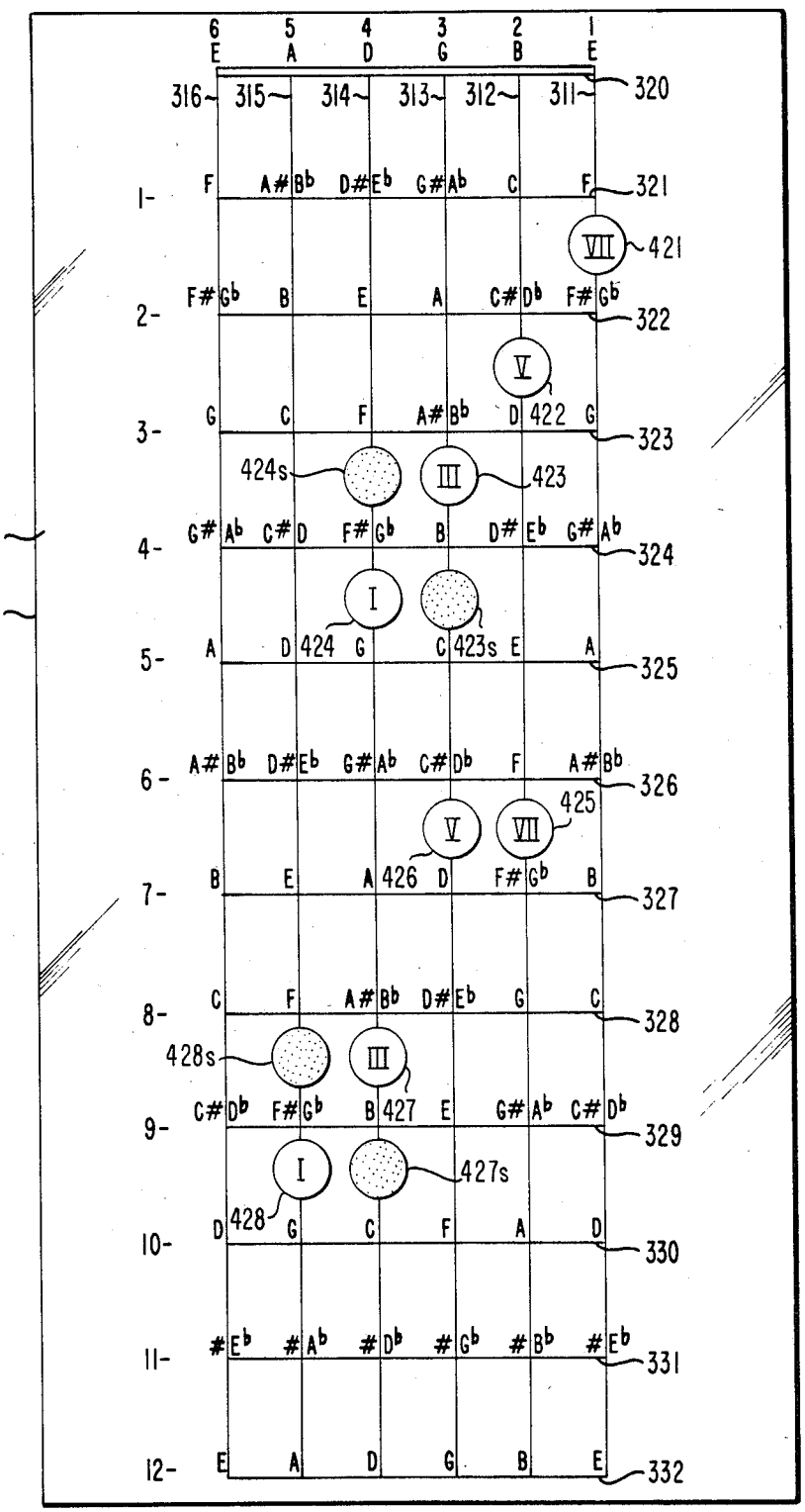
FIG. 4 shows applicant's fingerboard grid of FIG. 3 with applicants' harmonic markers positioned to depict the correct harmonic relationships between the notes comprising the two chords shown in FIG. 3.

Harmonic inter-relationships, among the notes of each chord shown in FIG. 3, is depicted in FIG. 4. Specifically, each chord shown in this figure is in the key of G. The first note of the chord, i.e., "G", is the first note in the U scale; the second note, i.e., "B", is the third note in the scale; the third note, i.e., "D", is the fifth note in the scale; and lastly the fourth or last note of the chord, i.e., "F sharp", is the seventh note in the scale. Moveable markers 431 through 424, and 425 through 428 are positioned on respective notes comprising each of these chords. Each marker, as shown, is numbered in a different numerical system, such as Roman numerals, in order to differentiate these markers from the fingering markers shown in FIGS. 1-3 and discussed hereinabove. Each specific Roman numeral indicates the relative position of each corresponding note in the associated scale, e.g., the "G" scale. The stipled markers 423s, 424s, 427s, and 428s have a differently colored cap than the other moveable markers in the figure and are used to depict the notes affected by contrary motion. In a similar manner, the harmonic inter-relationships amoung the notes comprising any scale—as will become evident from FIG. 6 and its accompanying discussion hereinbelow—can be easily depicted by appropriately positioning the indicators of the type shown in FIG. 4. Consequently, applicants' invention advantageously permits the student to quickly visually perceive harmonic inter-relationships existing between notes comprising chords and scales.

Figure 5:
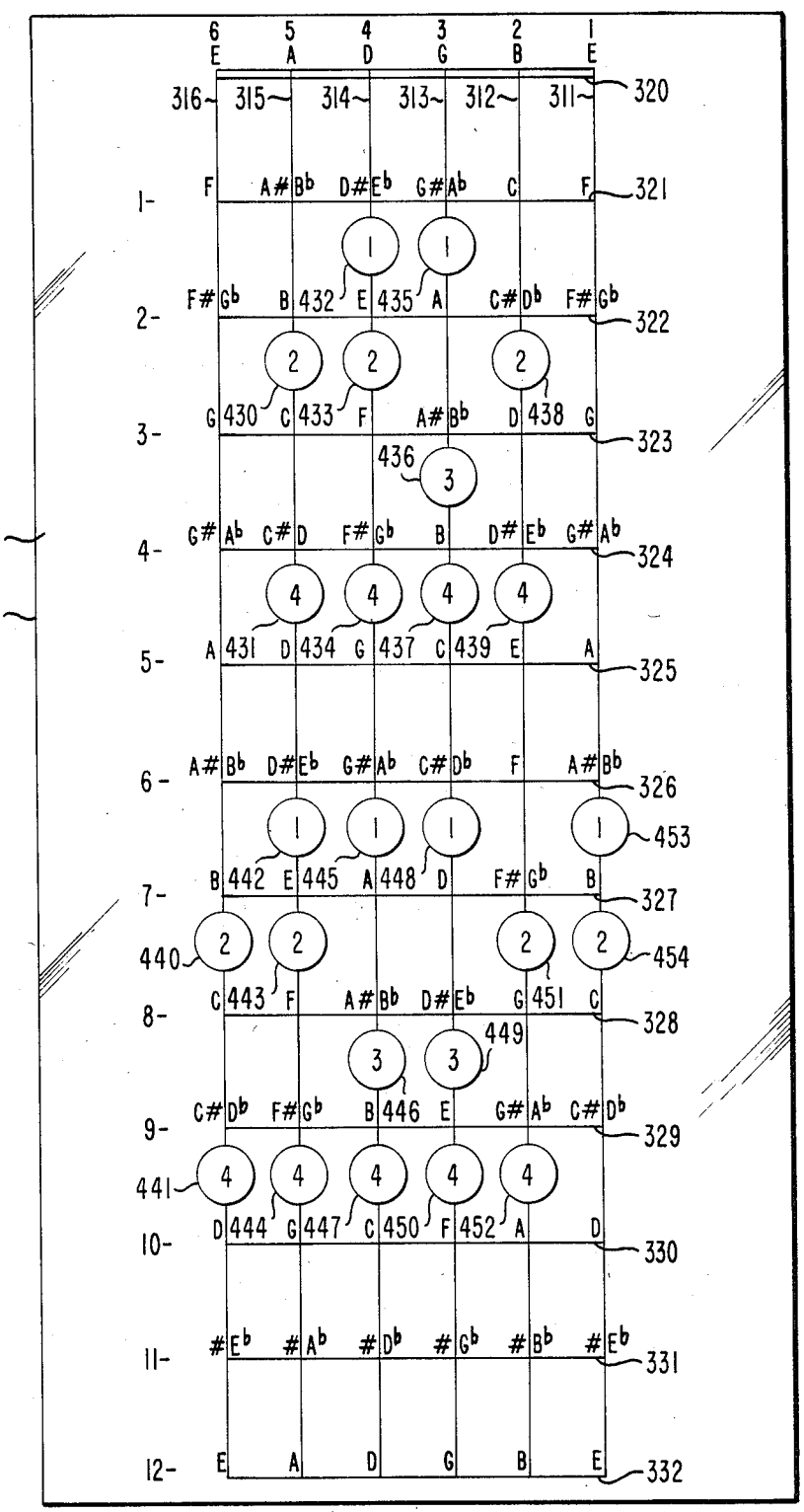
FIG. 5 shows applicants' fingerboard grid of FIG. 3 with the fingering markers arranged to depict the finger positions for an extended C scale occurring at two different positions of the guitar fingerboard.

In FIG. 5, the fingering positions are shown for each note comprising an extended C scale. The same scale is shown in two octaves. The fingering of the scale on the low octave is depicted by moveable markers 430 through 436. Moveable markers 437, 438, and 439 depict the fingering for the first three notes of the same scale in the next higher octave. The same scale, i.e., in the same low octave, represented by moveable markers 430 through 436, is also represented by moveable markers 440 through 466. The only difference between these two musically identical scales is that while they are both in the same octave, each occurs in a different position of the fingerboard. In a fashion similar to the notes represented by moveable markers 437, 438, and 439; moveable markers 447 through 454 represent the fingering for the notes of the notes of the C scale in successive higher octaves. The identically numbered moveable markers arranged in any horizontal row signify those notes that can be fingered by using the same corresponding finger of the left hand. In addition, key changes can be readily shown by merely repositioning the appropriate moveable marker. For example, the C scale represented by moveable markers 440 through 446 is shown in the key of "C". If moveable marker 443 is moved ½ step, i.e., from F to F sharp, then the resulting C scale changes to the key of "G". Thus, applicants' invention advantageously permits the student to both visually depict the fingering and visually identify relationships between scales and key changes associated therewith.

Figure 6:
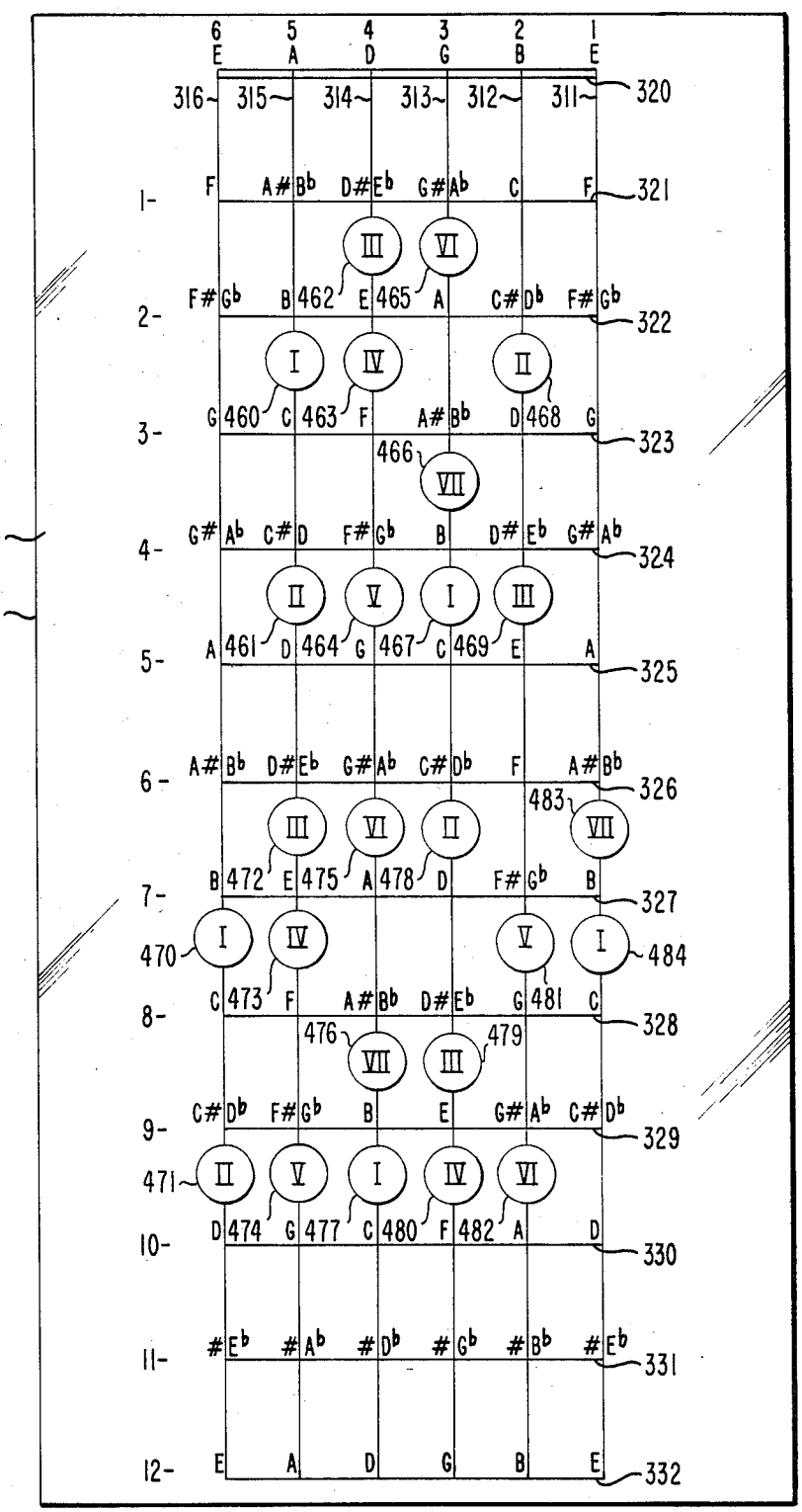
FIG. 6 shows applicants' fingerboard grid of FIG. 3 with the appropriate harmonic markers positioned to depict the correct harmonic relationships between the notes comprising the two extended C scales shown in FIG. 5.

The harmonic inter-relationships among the notes of the extended C scales—for which fingering is shown in FIG. 5—are depicted in FIG. 6 by appropriately positioned and numbered moveable markers 460 through 463, and 470 through 484. Each of these moveable markers is of the same type as shown in FIG. 4. Specifically, each marker bears a Roman numeral which corresponds to the relative sequential position of the associated note in the scale.

Advantageously, applicants' teaching device shown in FIG. 6 provides an easily understandable visual demonstration of "modes", i.e., musical scales that start on a different measurement or step (note). For example, in the so-called "Ionian" mode the "C" scale is ordinarily assumed to start with a "C" note, illustratively the note associated with moveable marker 460 which bears Roman numeral I. However, a large number of Spanish melodies is based upon the so-called "Phrygian" mode wherein, for example, the scale starts as the third note of the Ionian mode, i.e., the "E" note, illustratively represented by moveable marker 462, and concludes on the following "E" note, illustratively represented by moveable marker 469. By appropriately repositioning moveable markers 460 through 466, the "Phrygian" mode can be clearly shown. In a like manner, all the other musical modes can be easily depicted.

Figure 7:
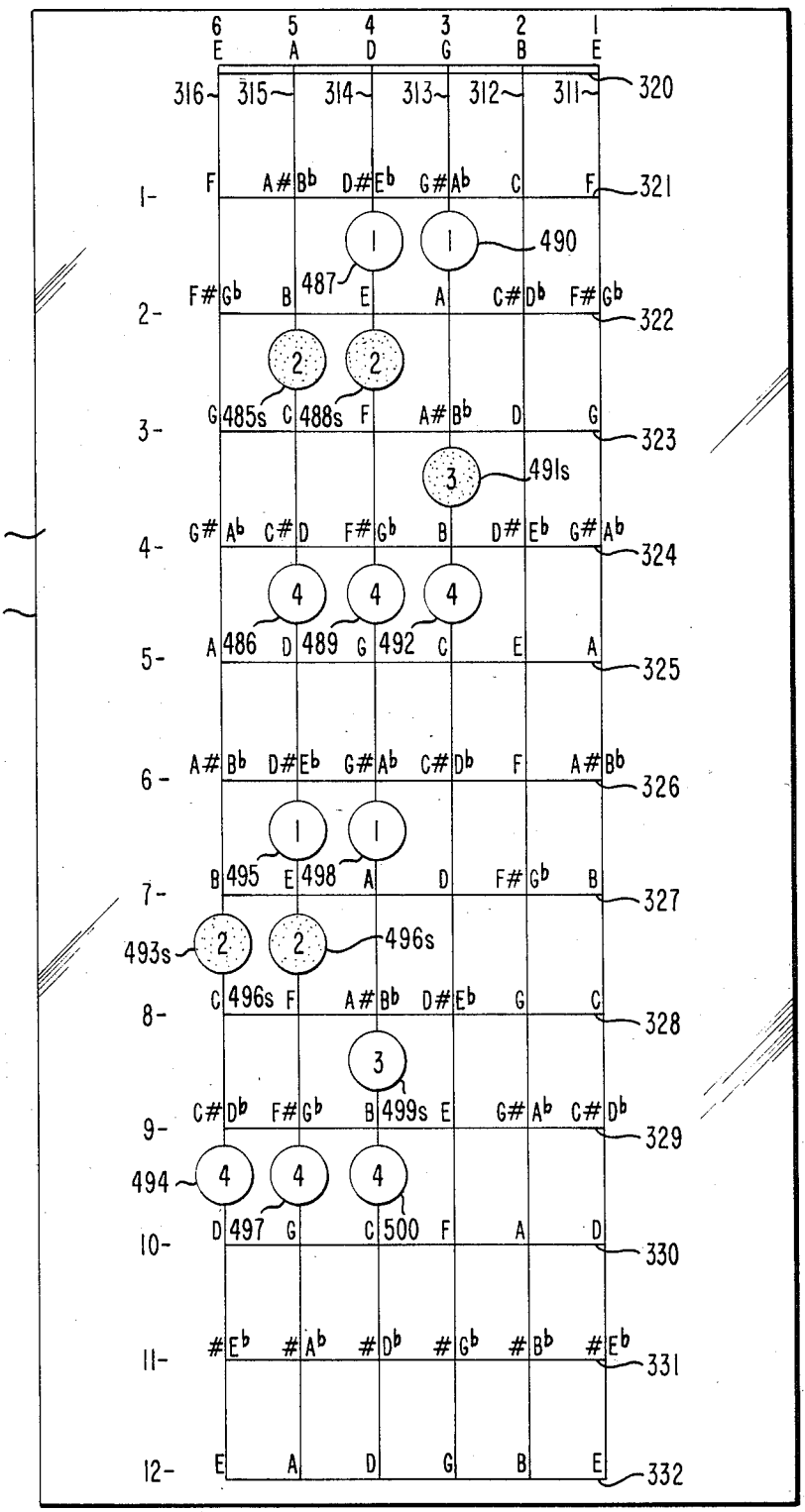
FIG. 7 shows applicants' fingerboard grid of FIG. 3 having the fingering markers positioned to depict the non-extended versions of the two C scales of FIG. 5 with, more particularly, the stipled markers used to indicate accented notes.

Lastly, as shown in FIG. 7, applicants' teaching device can easily indicate accented notes. The accented note pattern shown in FIG. 7 is representative of calypso, Latin, and rock and roll rhythms. Specifically, the fingering for two basic (non-extended) "C" scales is shown in this figure by the position of moveable markers 485s through 490, and 493s through 500. The stipled markers 485s, 488s and 491s, and 493s, 496s, and 499s, represent accented notes and have a cap that is colored differently from any of the other markers thusfar described. Consequently, these accented notes are quite visibly apparent to the student.

Clearly, from the foregoing description, it is readily apparent to anyone skilled in the art that any or all of the moveable markers need not be magnetic. In fact, any temporary fastening device that can secure a colored cap of similar structure to a flat base can be used in lieu of the magnets. Such devices include, but are not limited to tacks, velcro strips, hooks, and the like. However, the material used for the base must be appropriately chosen such that it does not disintegrate from the movement of the moveable markers, specifically the action of the fastening device against the base, in a relatively short period of time.

Furthermore, the fingerboard grid, i.e., grid 30, is not limited to being printed on a base member but can be visually displayed in any form. Specifically, with the proliferation of low cost computers, applicants' teaching device can advantageously be implemented in computer software which, in turn, causes applicants' fingerboard grid to appear on a visual display such as a cathode ray tube (CRT), a liquid crystal, a plasma panel or the like. A plurality of moveable indicators, or cursors, of different sizes, shapes, or colors and bearing different numbers or letters could be readily used in lieu of applicants' differently colored magnetic markers. The desired indicators could be appropriately positioned through a keyboard operating under software control. With such an implementation, the fingering and harmonic information for any number of notes, scales, and chords can be readily stored in computer memory for later display by the student and/or instructor.

Clearly, such an implementation can be readily adapted for use in a video game or a teaching program.

Lastly, while applicants' teaching device has been described in terms of the guitar, it can be readily extended to any desired instrument. To accomplish this, the letters, appearing on sheet 35 and identifying each particular note, are changed to correspond to the actual notes produced by the desired instrument.

Although a particular embodiment has been shown and described herein, many varied embodiments of the present invention may be devised by those skilled in the art without departing from the spirit and scope of the invention.

We claim:

1. A musical teaching device comprising:
    a base having a sheet of material with a grid appearing thereon, said grid representing the fingerboard of a stringed instrument having strings and frets, wherein said grid has a plurality of lines which represent the strings and a plurality of lines which represent the frets, each string line intersecting each fret line at a corresponding point of intersection,
    a plurality of indicators positioned within said grid, wherein each indicator is fixedly situated in the vicinity of a corresponding one of said points of intersection and musically notates a particular musical note that would be obtained from that instrument by depressing the corresponding represented string against the corresponding represented fret at the corresponding point of intersection on the fingerboard of said instrument and simultaneously picking that string on the instrument,
    a plurality of moveable markers, wherein each of said markers can be positioned anywhere on said grid and is visually identified by a symbol appearing on a top surface of that marker so that the placement of each of said markers over said grid indicates where on the fingerboard a corresponding string is to be depressed and said symbol on said marker represents musical information other than the name of a note.

2. The teaching device in claim 1 wherein the indicators appear on a substantially transparent overlay that is positioned over the base and beneath said markers.

3. The teaching device in claim 2 wherein each of said moveable markers is magnetic.

4. The teaching device in claim 3 wherein said grid is printed on a magnetic base member.

5. The teaching device in claim 4 wherein each of said moveable markers is comprised of a magnetized base, and a colored cap on which said symbol appears.

6. The teaching device in claim 3 wherein a first set of said moveable markers is used to indicate fingering and a second set of said moveable markers different from the set used to indicate harmonic relationships.

7. The teaching device in claim 6 wherein said symbol appearing on each moveable marker of said first set corresponds to a particular finger of a hand.

8. The teaching device in claim 7 in which each of said symbols appearing on each marker of said first set is an Arabic numeral.

9. The teaching device in claim 6 wherein the symbol printed on each moveable marker of said second set corresponds to a numerical position of a musical note in a musical scale.

10. The teaching device in claim 9 wherein each of said symbols appearing on each of the markers of said second set is a Roman numeral.

11. The teaching device in claim 6 wherein each moveable marker which is used to indicate a corresponding accented musical note is colored with a first color, each moveable marker which is used to indicate a musical note affected by contrary motion is colored with a second color, and each moveable marker which is used to indicate an un-accented note that is not affected by contrary motion is colored with a third color.

12. The teaching device in claim 2 wherein a first set of moveable markers, different from the first set, of moveable markers is used to indicate fingering and a second set is used to indicate harmonic relationships.

13. The teaching device in claim 12 wherein said symbol appearing on each moveable marker of said first set corresponds to a particular finger of a hand.

14. The teaching device in claim 13 in which each of said symbols appearing on each marker of said first set is an arabic numeral.

15. The teaching device in claim 12 wherein the symbol printed on each moveable marker of said second set corresponds to a numerical position of a musical note in a musical scale.

16. The teaching device in claim 15 wherein each of said symbols appearing on each of the markers of said second set is a Roman numeral.

17. The teaching device in claim 12 wherein each moveable marker which is used to indicate a corresponding accented musical note is colored with a first color, each moveable marker which is used to indicate a musical note affected by contrary motion is colored with a second color, and each moveable marker which is used to indicate an un-accented note that it is not affected by contrary motion is colored by a third color.

18. The teaching device in claim 5 further comprised of:
- a first set of said moveable markers used to indicate fingering wherein said symbol appearing on each moveable marker in said first set is an arabic numeral which corresponds to a particular finger of a hand,
- a second set of said moveable markers different from said first set used to indicate harmonic relationships wherein said symbol appearing on each moveable marker in said second set is a Roman numeral which corresponds to a numerical position of a musical note in a musical scale, and
- wherein each moveable marker which is used to indicate a corresponding accented musical note is colored with a first color, each moveable marker which is used to indicate a musical note, which is affected by contrary motion is colored with a second color, and each moveable maker which is used to indicate an un-accented note which is unaffected by contrary motion is colored with a third color.

19. A musical teaching device comprising:
- a base member having a magnetic sheet of material with a grid appearing thereon, said grid representing the fingerboard of a stringed instrument having strings and frets, wherein said grid has a plurality of lines which represent the strings and a plurality of lines which represent the frets, each string line intersecting each fret line at a corresponding point of intersection,
- a plurality of indicators positioned within said grid, wherein each indicator is fixedly situated in the vicinity of a corresponding one of said points of intersection and musically notates a particular musical note that would be obtained from that instrument by depressing the corresponding represented string against the corresponding represented fret at the corresponding point of intersection on the fingerboard of said instrument and simultaneously picking that string on the instrument,
- at least two different sets of moveable markers, wherein each of said markers can be positioned anywhere on said grid and is visually identified by a symbol appearing on a top surface of that marker so that the placement of each of said markers over said grid indicates where on the fingerboard a corresponding string is to be depressed and said symbol on said marker represents different musical information other than the name of a note,
- wherein the first set of said markers is used to indicate fingering and said symbol appearing on each moveable marker in said first set is an Arabic numeral which corresponds to a particular finger of a humam hand,
- the second set of moveable markers is used to indicate harmonic relationships and said symbol appearing on each moveable marker in said second set is a Roman numeral which corresponds to a numerical position of a musical note in a musical scale, and
- each moveable marker which represents a corresponding accented musical note is colored with a first color, each moveable marker which represents a musical note which is affected by contrary motion is colored with a second color, and each moveable marker which represents an unaccented note that is not affected by contrary motion is colored with a third color.

* * * * *